(12) United States Patent
Potter

(10) Patent No.: US 10,295,139 B2
(45) Date of Patent: May 21, 2019

(54) HEADLAMP ROAD-WRITING SYSTEMS

(71) Applicant: Valeo North America, Inc., Troy, MI (US)

(72) Inventor: Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 86 days.

(21) Appl. No.: 15/684,513

(22) Filed: Aug. 23, 2017

(65) Prior Publication Data

US 2019/0063717 A1  Feb. 28, 2019

(51) Int. Cl.
*F21S 41/675* (2018.01)
*F21K 9/64* (2016.01)
*B60Q 1/14* (2006.01)
*F21S 41/20* (2018.01)
*F21S 41/14* (2018.01)
*F21S 41/32* (2018.01)
*F21S 41/663* (2018.01)
*F21Y 115/30* (2016.01)

(52) U.S. Cl.
CPC .......... *F21S 41/675* (2018.01); *B60Q 1/1415* (2013.01); *F21K 9/64* (2016.08); *F21S 41/14* (2018.01); *F21S 41/285* (2018.01); *F21S 41/321* (2018.01); *F21S 41/663* (2018.01); *F21Y 2115/30* (2016.08)

(58) Field of Classification Search
CPC ........ F21S 41/675; F21S 41/663; F21S 41/14; F21S 41/321; F21S 41/285; F21K 9/64

USPC ......................................... 362/507, 514, 466
See application file for complete search history.

(56) References Cited

U.S. PATENT DOCUMENTS

| 5,730,519 A * | 3/1998 | Okuchi ................. F21S 41/24 |
| | | 362/559 |
| 9,108,568 B2 * | 8/2015 | Takahira .............. B60Q 1/0023 |
| 2009/0016073 A1 * | 1/2009 | Higgins-Luthman ....................... |
| | | B60Q 1/085 |
| | | 362/465 |

* cited by examiner

*Primary Examiner* — Paultep Savusdiphol
(74) *Attorney, Agent, or Firm* — Oblon, McClelland, Maier & Neustadt, L.L.P.

(57) ABSTRACT

A headlamp assembly has a low beam assembly configured to generate a low-beam distribution including a plurality of flat luminous segments configured to produce a composite flat beam pattern when activated; a kink module having a first light source and a second light source; a near-field road-writing segment located about a central vertical position of the low-beam distribution; a far-field road-writing segment located above the near-field road-writing segment of the low-beam distribution; and circuitry configured to inactivate one or more of the flat luminous segments located within the near-field road-writing segment of the low-beam distribution and inactivate the first light source when the near-field road-writing segment and the far-field road-writing segment are activated. The headlamp assembly also has a high beam assembly configured to generate a high-beam distribution.

16 Claims, 21 Drawing Sheets

HEADLAMP ROAD-WRITING SYSTEMS

BACKGROUND

A Digital Micro-mirror Device (DMD) allows an image to be projected onto a road surface, which is also known as road writing. Road writing requires a combination of an image projection pattern and a complementary pattern. The complementary low beam lamp pattern needs to be adapted to create a dark region in the foreground to allow the addition of the image projection pattern. The dark region needs to provide a sufficient contrast for the projected image to create a clear image on the road surface.

One road-writing system includes a low beam lamp pattern with a flat beam and a specialized kink beam near cutoff, plus a road-writing projection. The flat portion of the beam needs to be asymmetrical to create a proper tunnel in the near foreground for the projected image.

FIG. 1A illustrates a low beam luminous distribution for a left headlamp with a DMD road-marking distribution portion 10, a kink flat distribution portion 20, a flat beam distribution portion 30, a DMD Adaptive Driving Beam (ADB) distribution portion 40, and a complementary high beam distribution portion 50. FIG. 1B is a symmetrical low beam luminous distribution for a right headlamp with the DMD road-marking distribution portion 10, the kink flat distribution portion 20, the flat beam distribution portion 30, the DMD Adaptive Driving Beam (ADB) distribution portion 40, and the complementary high beam distribution portion 50. As illustrated in FIGS. 1A and 1B, the beam distribution patterns spread about 30° right for the left headlamp distribution and about 30° left for the right headlamp distribution.

When a DMD image is projected, light from the right headlamp covers the left headlamp in order to make an opening in front of the vehicle for the DMD projection. However, with a conventional headlamp, there is no opening where the luminous distribution spreads right and left beyond the vertical axis. Therefore, in order to create an opening in front of the vehicle for a DMD image projection, the left headlamp distribution needs to spread to the left with no spread to the right, and the right headlamp distribution needs to spread to the right with no spread to the left.

Unfortunately, certain vehicle headlamp requirements fail this particular luminous distribution pattern because there is no light at approximately the 15° or 20° distribution point. In addition, this distribution pattern can have poor homogeneity for a low beam luminous distribution. Also, the DMD road marking portion 10 is activated at all times to fill the newly-created opening in the luminous distribution pattern.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

(1) A headlamp assembly has a low beam assembly configured to generate a low-beam distribution including a plurality of flat luminous segments configured to produce a composite flat beam pattern when activated; a kink module having a first light source and a second light source; a near-field road-writing segment located about a central vertical position of the low-beam distribution; a far-field road-writing segment located above the near-field road-writing segment of the low-beam distribution; and circuitry configured to inactivate one or more of the flat luminous segments located within the near-field road-writing segment of the low-beam distribution and inactivate the first light source when the near-field road-writing segment and the far-field road-writing segment are activated. The headlamp assembly also has a high beam assembly configured to generate a high-beam distribution.

(2) The headlamp assembly of (1), wherein the near-field road-writing segment includes a digital micro-mirror device (DMD) near-field road-writing segment and the far-field rad-writing segment includes a DMD far-field mad-writing segment.

(3) The headlamp assembly of either (1) or (2), wherein the circuitry is further configured to keep the second light source activated when the near-field road-writing segment and the far-field road-writing segment are activated.

(4) The headlamp assembly of any one of (1) through (3), wherein a first power level of a first group of flat luminous segments differs from a second power level of a second group of flat luminous segments.

(5) The headlamp assembly of any one of (1) through (4), wherein the plurality of flat luminous segments includes a range of seven to thirty two individual flat luminous segments.

(6) The headlamp assembly of any one of (1) through (5), wherein the plurality of flat luminous segments includes a first row and a second row of individual flat luminous segments.

(7) The headlamp assembly of any one of (1) through (6), wherein a first power level of the first row of individual flat luminous segments differs from a second power level of the second row of individual flat luminous segments.

(8) The headlamp assembly of any one of (1) through (7), wherein the first light source includes a laser diode light source.

(9) A low beam headlamp assembly including a plurality of flat luminous segments configured to produce a composite flat beam pattern of a low-beam distribution when activated; a kink module having a first light source and a second light source; a near-field road-writing segment located about a central vertical position of the low-beam distribution; a far-field road-writing segment located above the near-field road-writing segment of the low-beam distribution; and circuitry configured to inactivate one or more of the flat luminous segments located within the near-field road-writing segment of the low-beam distribution and inactivate the first light source when the near-field road-writing segment and the far-field road-writing segment are activated.

(10) The low beam headlamp assembly of (9), wherein the near-field road-writing segment includes a digital micro-mirror device (DMD) near-field road-writing segment and the far-field road-writing segment includes a DMD far-field road-writing segment.

(11) The low beam headlamp assembly of either (9) or (10), wherein the circuitry is further configured to keep the second light source activated when the near-field road-writing segment and the far-field road-writing segment are activated.

(12) The low beam headlamp assembly of any one of (9) through (11), wherein a first power level of a first group of flat luminous segments differs from a second power level of a second group of flat luminous segments.

(13) The low beam headlamp assembly of any one of (9) through (12), wherein the plurality of flat luminous segments includes a range of seven to thirty two individual flat luminous segments.

(14) The low beam headlamp assembly of any one of (9) through (13), wherein the plurality of flat luminous segments includes a first row and a second row of individual flat luminous segments.

(15) The low beam headlamp assembly of any one of (9) through (14), wherein a first power level of the first row of individual flat luminous segments differs from a second power level of the second row of individual flat luminous segments.

(16) The low beam headlamp assembly of any one of (9) through (15), wherein the first light source includes a laser diode light source.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Embodiments described herein provide systems for a low beam road-writing headlamp distribution. Inactivation of central low beam flat segments and a kink segment provides a mechanism to project a clear contrasting image onto a road surface in front of a vehicle.

Figure 1A:
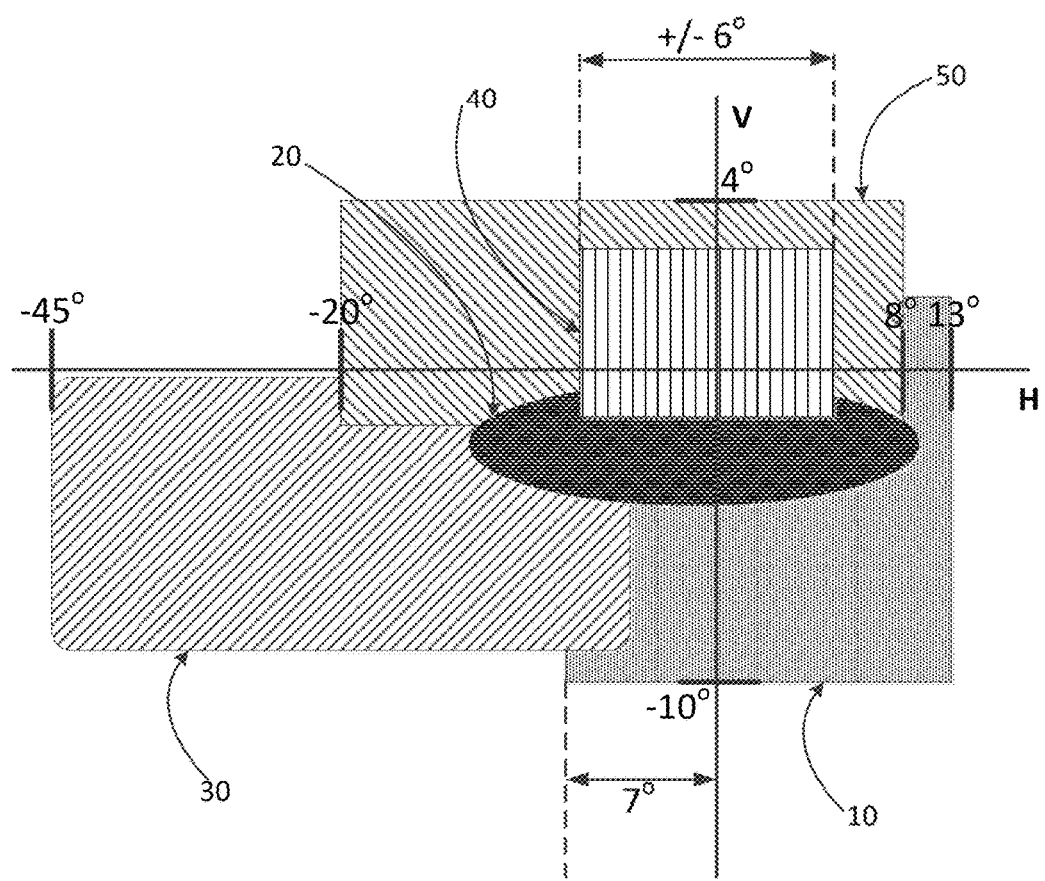
FIG. 1A illustrates a low beam luminous distribution for a left headlamp with a road-marking capability according to one embodiment.
Figure 1B:
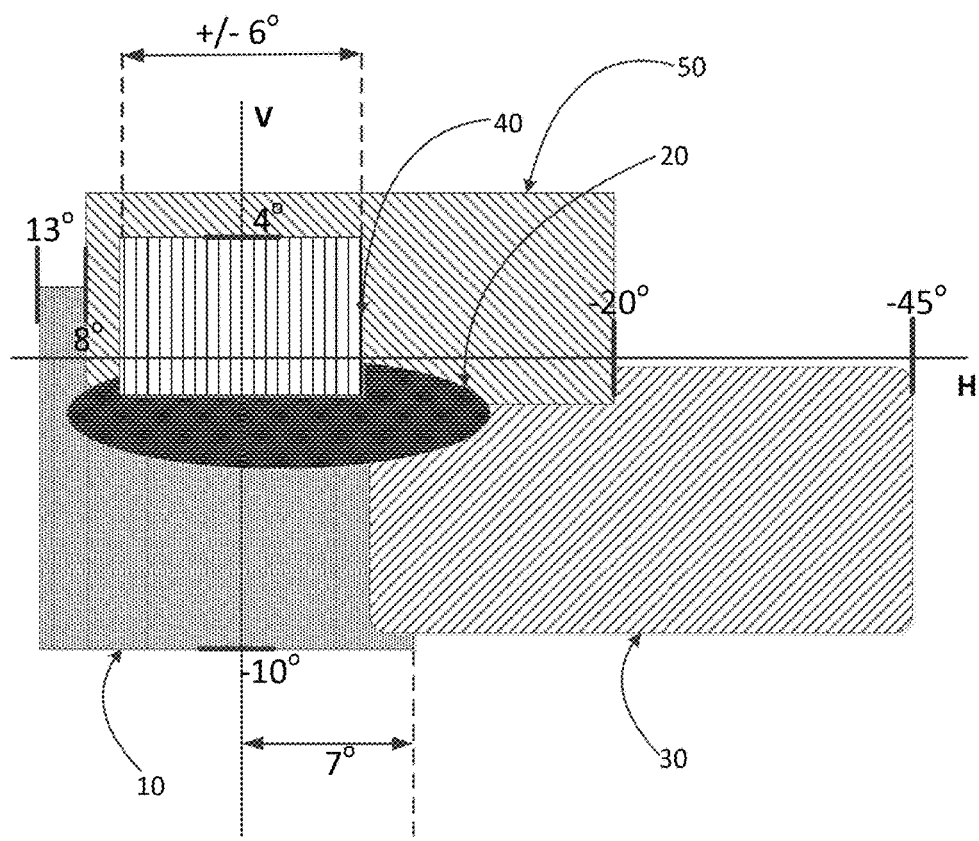
FIG. 1B illustrates a low beam luminous distribution for a right headlamp with a road-marking capability according to one embodiment.
Figure 2A:
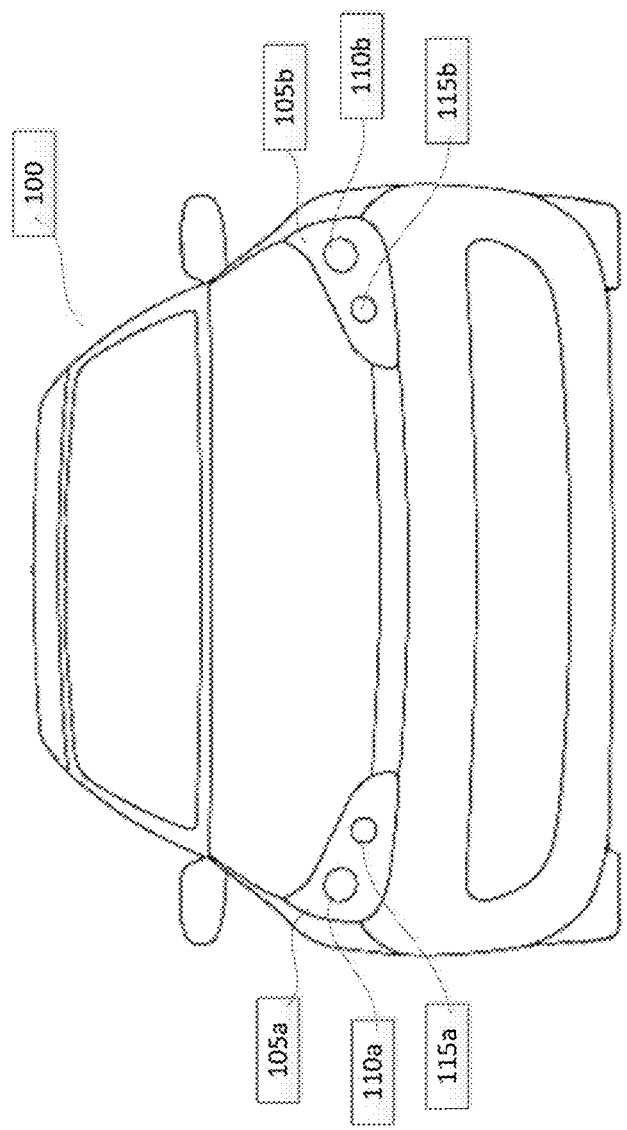
FIG. 2A illustrates a front-end of an exemplary motor vehicle according to one embodiment.

FIG. 2A illustrates a front-end of an exemplary motor vehicle 100. Motor vehicle (10 includes two headlamp assemblies 105a and 105b. Headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction.

Figure 2B:
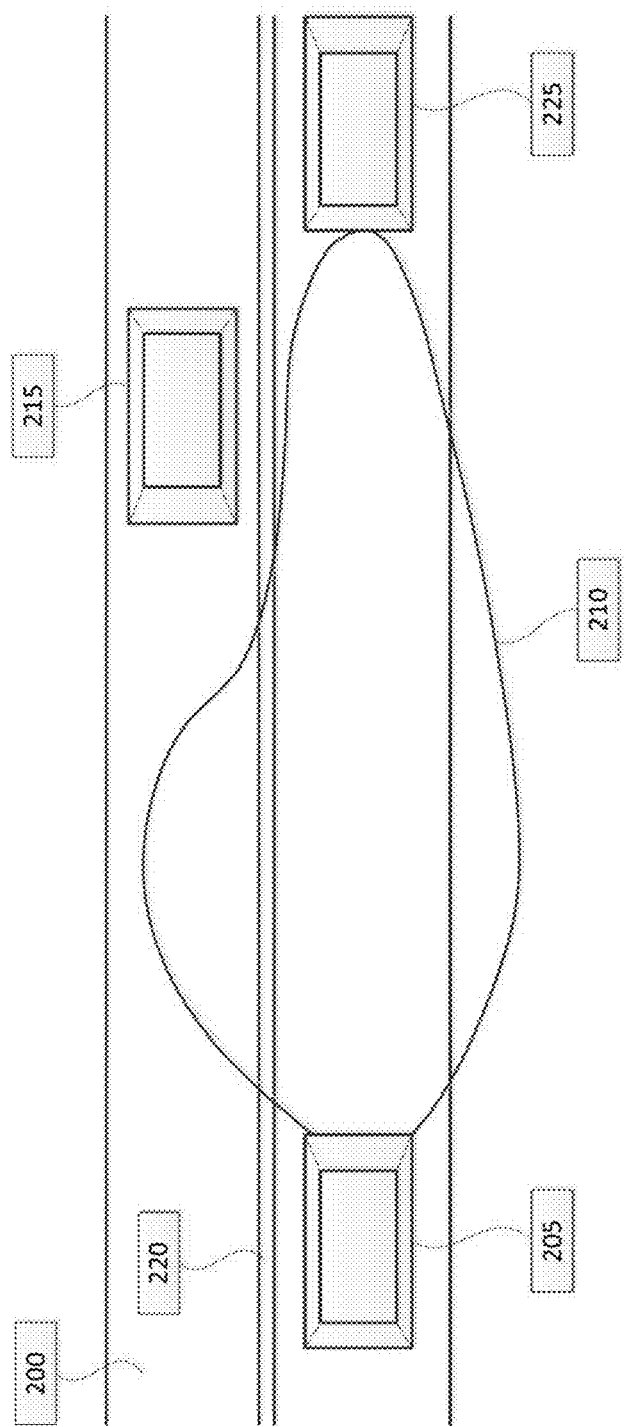
FIG. 2B is a schematic diagram of an exemplary roadway, a motor vehicle, and a light distribution pattern according to one embodiment.

FIG. 2B is a schematic diagram of an exemplary roadway 200, motor vehicle 205, and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction.

Figure 3A:
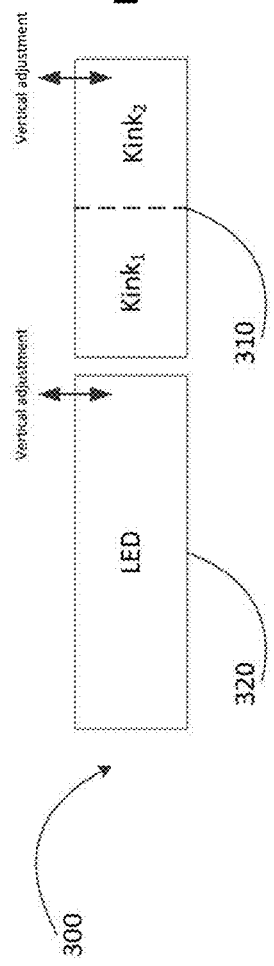
FIG. 3A illustrates an exemplary hybrid headlamp according to one embodiment.

FIG. 3A illustrates an exemplary hybrid headlamp 300 according to embodiments described herein. FIG. 3A illustrates a kink module 310 and a LED flat module 320. In the kink module 310, $kink_1$ represents a first kink light source and $kink_2$ represents a second kink light source. In one embodiment, $kink_1$ and/or $kink_2$ represent a first and/or second laser diode light source, respectively. In a second embodiment, $kink_1$ and $kink_2$ represent a first and second standard LED light source, respectively.

Figure 3B:
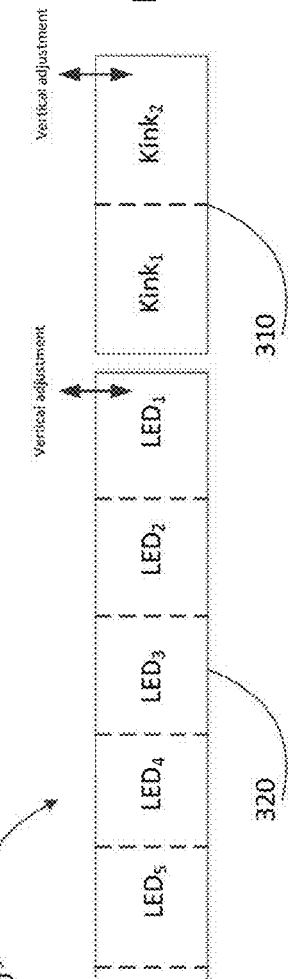
FIG. 3B illustrates a laser diode module and an LED module according to one embodiment.
Figure 3C:
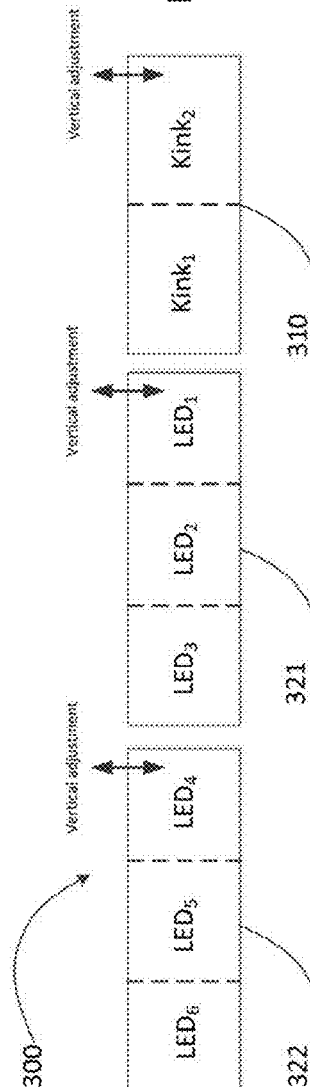
FIG. 3C illustrates a laser diode module and two LED modules according to one embodiment.

The present inventors recognized that separation of the kink module 310 from the LED module 320 facilitates separate aiming and alignment of the two modules with associated tolerances. FIG. 3A, as well as FIGS. 3B and 3C, illustrates the independent vertical adjustment of the kink module 310 from the LED flat module 320. When the kink module 310 includes a first and second laser diode light source, the kink module 310 of laser diode light sources typically needs laser safety sensors and has additional thermal requirements. Therefore, the separate kink module 310 and LED flat module 320 accommodate a laser diode environment.

FIG. 3B illustrates the kink module 310 and an LED flat module 320 having multiple LED components. FIG. 3B illustrates six LED components, $LED_1$ through $LED_6$. However, less than six LED components or more than six LED components are contemplated by embodiments described herein.

FIG. 3C illustrates the kink module 310 and a first LED flat module 321 having three LED components $LED_1$ through $LED_3$, and a second LED flat module 322 having three LED components $LED_4$ through $LED_6$. However, more than two LED flat modules are contemplated by embodiments described herein. In addition, less than three or more than three LED components within each LED flat module are contemplated by embodiments described herein.

Figure 4A:
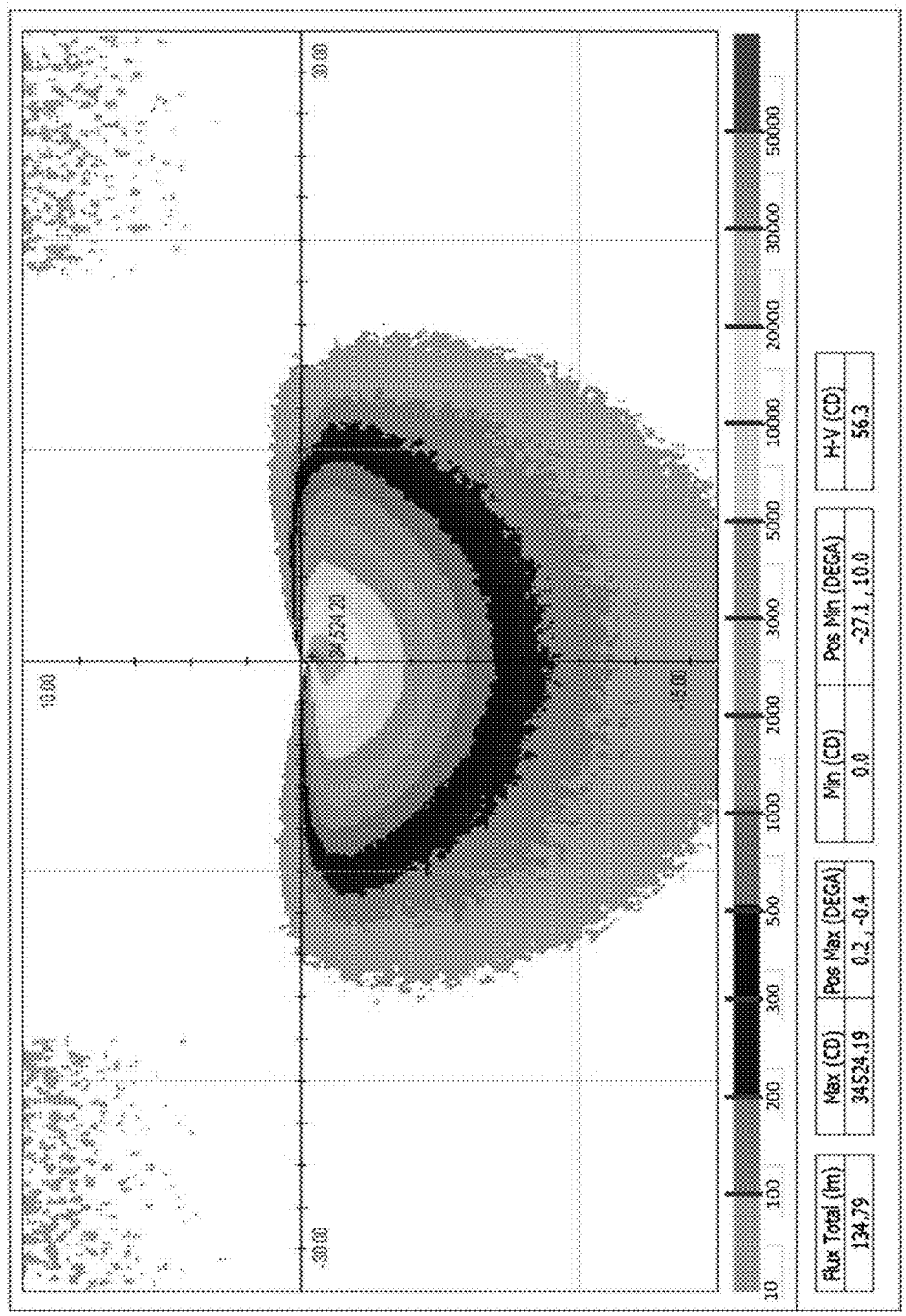
FIG. 4A illustrates an exemplary luminous intensity distribution for a laser diode source according to one embodiment.

FIG. 4A illustrates an exemplary luminous intensity distribution for a first kink source $K_1$. FIG. 4A illustrates different levels of intensity, wherein illustrated features include a total flux in lumens (lm), a maximum and minimum intensity value in candela (CD), a maximum and minimum center point given in x-y degree coordinates (DEGA), and a horizontal-vertical (H-V) intensity value given in candelas. $K_1$ provides a maximum intensity hot spot to provide adequate light at a distance down the road. The hot spot has a small aperture height.

Figure 4B:
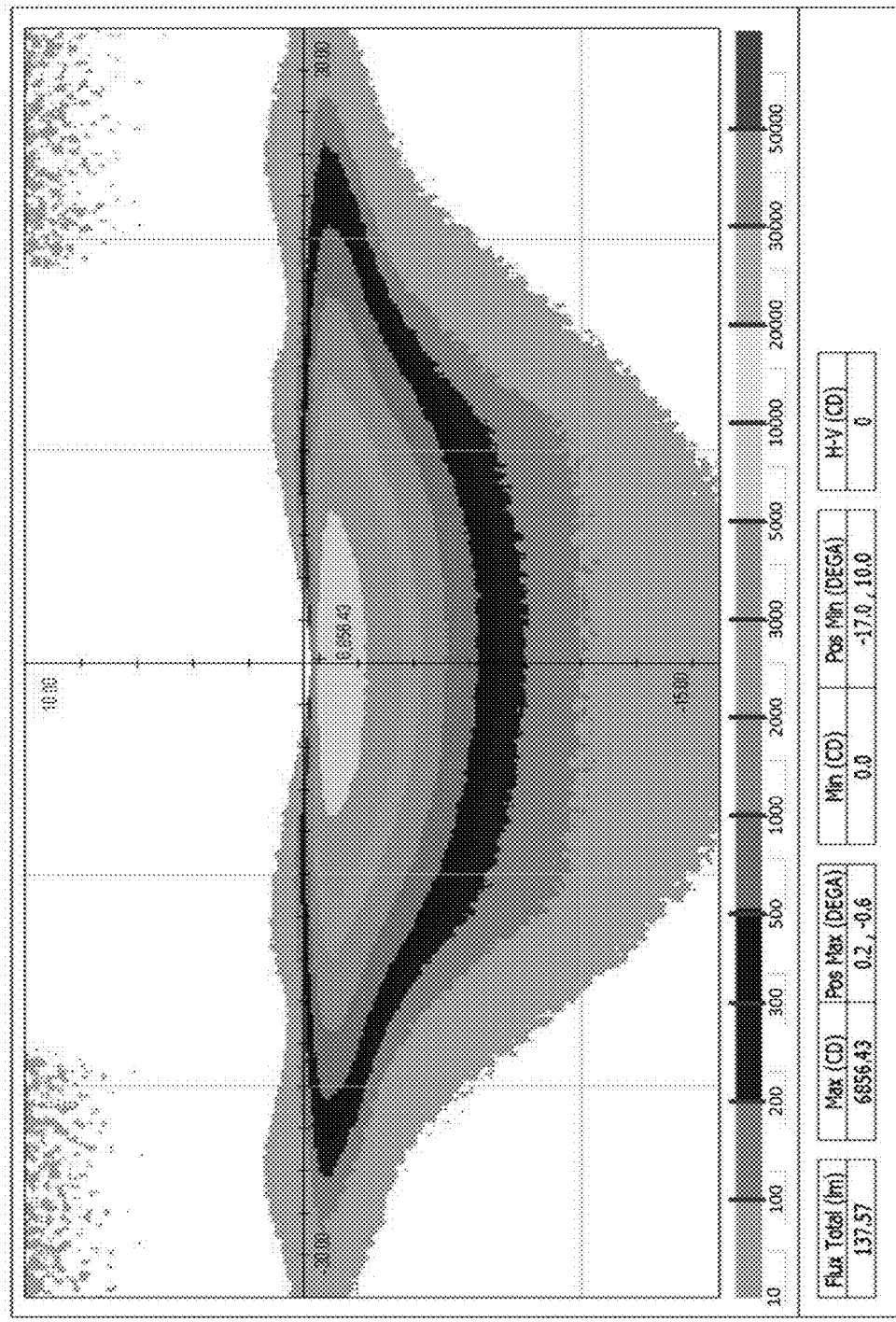
FIG. 4B illustrates an exemplary luminous intensity distribution for a laser diode source according to one embodiment.

FIG. 4B illustrates an exemplary luminous intensity distribution for a second kink source $K_2$. The luminous intensity distribution of $K_2$ has more spread than $K_1$ to blend with a LED flat module.

Any number of kink sources having different intensity distributions may be used to provide a desired blending transition from the hot spot of $K_1$ to the intensity distribution of a particular LED flat module. In one embodiment, both $K_1$ and $K_2$ can be laser diode sources. In a second embodiment, one of the kink sources can be replaced with a high luminance LED component due to the distribution pattern and small hot spot area, while the other kink source is a laser diode source. This would provide a lower cost and better adaptation of color to the LED flat module than would a laser diode module, but intensity transitions may become more noticeable. Combinations of laser diode and LED flat sources may be used to achieve a desired effect. Laser sources have the benefit of source luminance, which provides a higher intensity hot spot or a hot spot located at a higher location in the pattern. LED sources tend to be lower in cost and have fewer safety issues. However, high luminance LEDs are approaching the luminance of conventional LED sources.

Figure 4C:
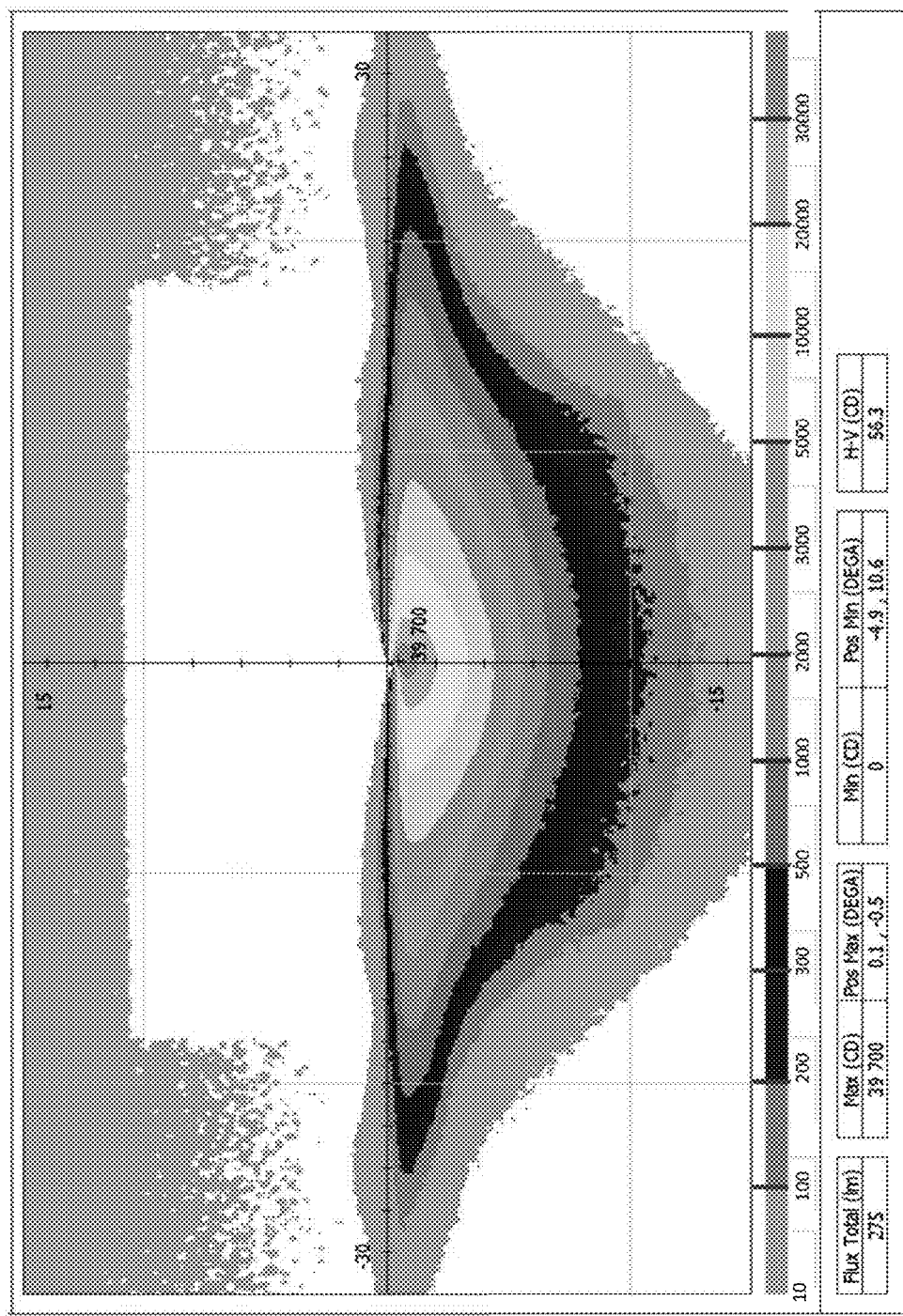
FIG. 4C illustrates an exemplary combined luminous intensity distribution for two laser diode sources according to one embodiment.

FIG. 4C illustrates an exemplary combined luminous intensity distribution for the first kink $K_1$ and the second kink $K_2$. The combined kink sources provide improved tolerances and are sufficient to meet most headlamp standards and test points. In an embodiment, the optical configuration of $K_1$ and $K_2$ are the same.

Figure 5:
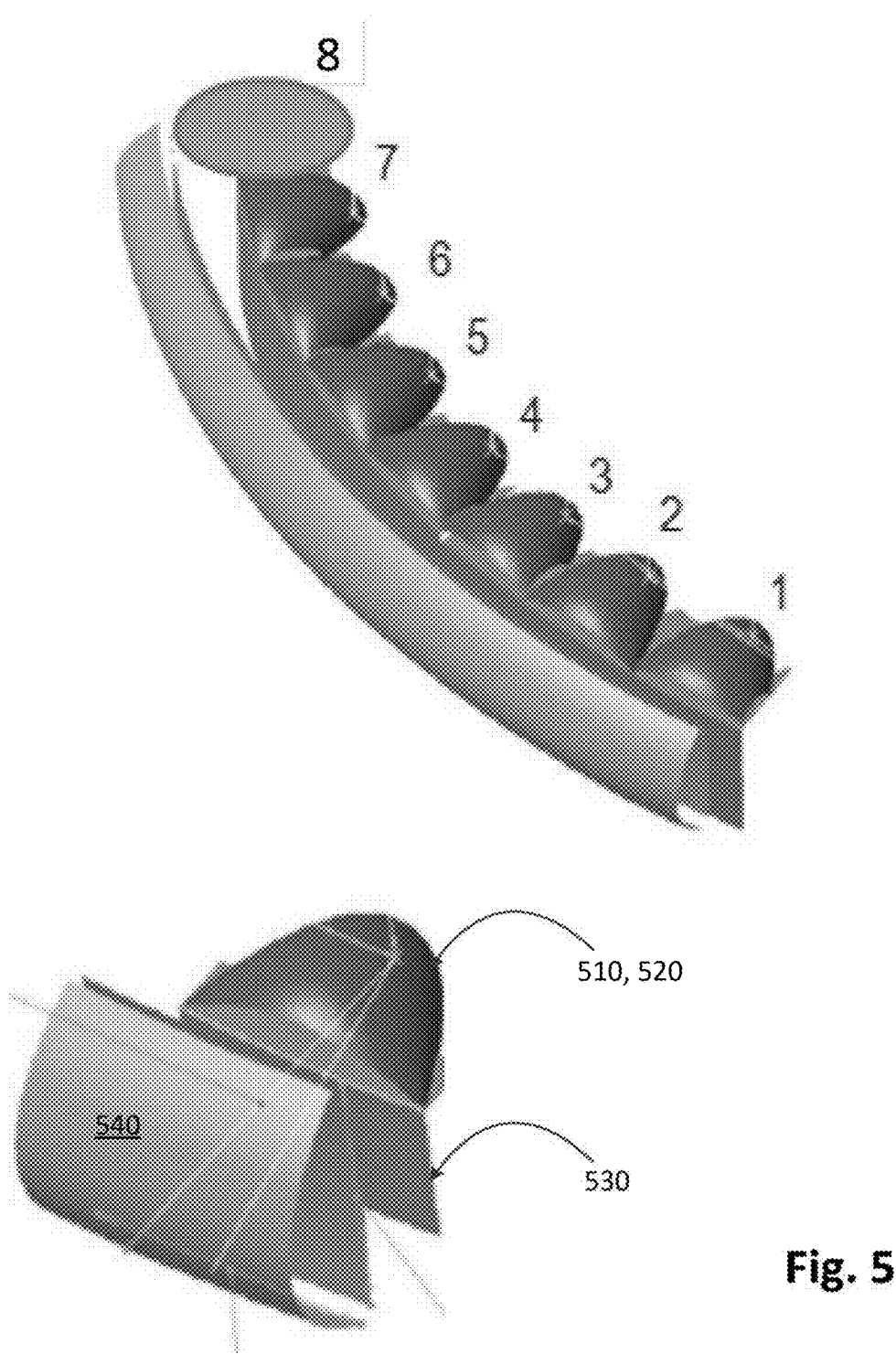
FIG. 5 illustrates a layout of an exemplary hybrid low beam array assembly according to one embodiment.

FIG. 5 illustrates an expanded view of an exemplary hybrid low beam array assembly. FIG. 5 illustrates seven solid state light source modules, numbered one through seven. However, more than seven or fewer than seven solid state light source modules are contemplated by embodiments described herein. Module eight represents the laser solid state light source module. FIG. 5 also illustrates a single continuous lens and folder. However, separate reflector segments are also contemplated by embodiments described herein.

In an embodiment given for illustrative purposes only, the dimensions for each segment (individual module plus an associated portion of the reflector 510 and 520, folder 530, and imaging lens 540) is approximately 15 mm in height, 18 mm in width, and 25 mm in depth. When each solid state light source module produces approximately 300 lumens, the array of lumens produces 7×300=approximately 2100 lumens. The elliptical reflector 610 and 620 can be made of thermoplastic or metallic material and can have a focal length range of 1.5-4 mm and a reflectivity (R) range of 0.90-0.95. The folder 530 material has a reflectivity of approximately 0.8-0.95. The imaging lens 540 can be made of PMMA, PC, silicone, glass, or thermoplastic material. However, other materials and dimensions of segments are contemplated by embodiments described herein.

Figure 6:
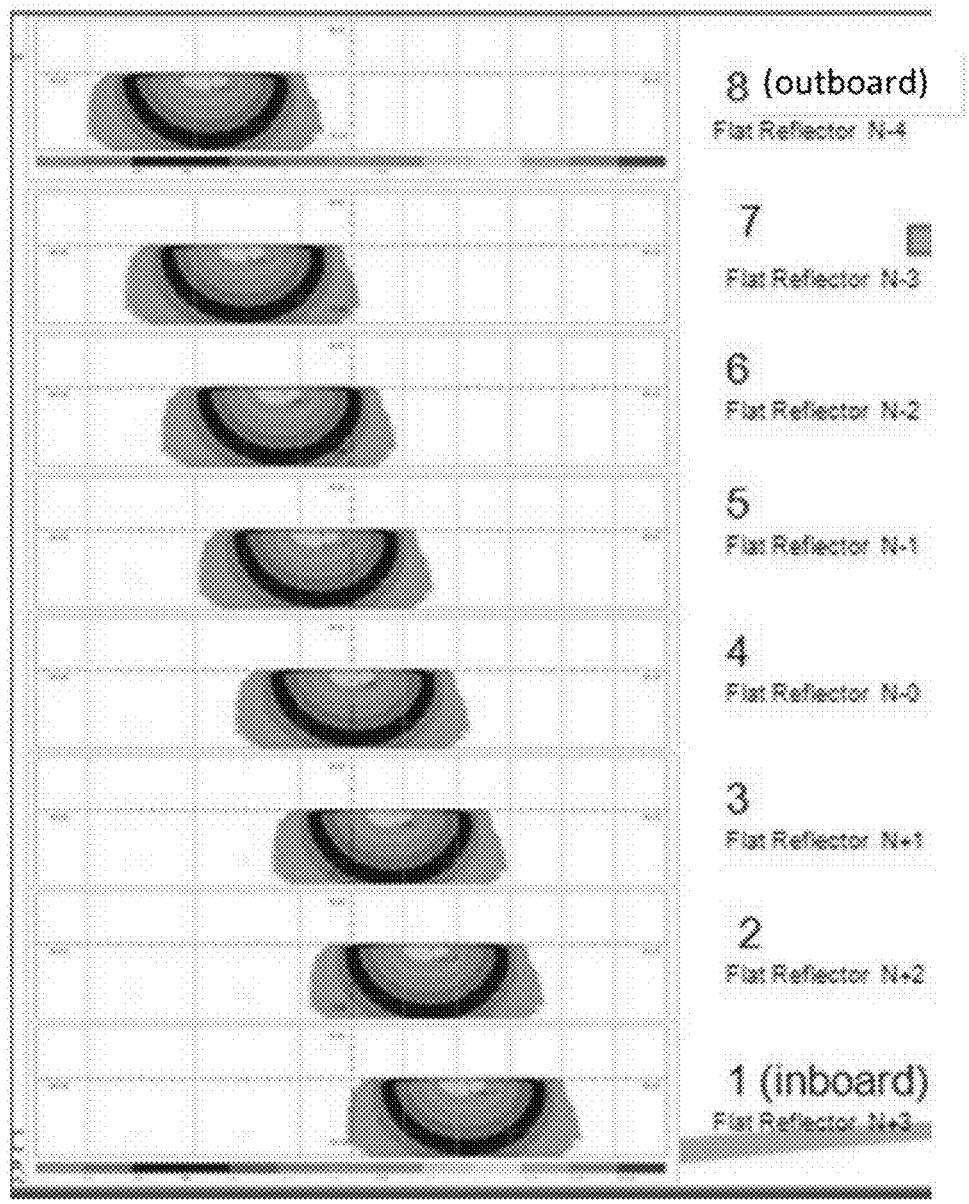
FIG. 6 illustrates a beam pattern simulation of each flat reflector for a LED flat module according to one embodiment.

FIG. 6 illustrates a beam pattern simulation of each flat reflector for a LED flat module, such as the eight reflectors illustrated in the laser low beam flat module of FIG. 5. The numbering next to flat reflectors 1-8 designates a position of each flat reflector within the module, wherein N–0 is the center flat reflector position within the module.

Figure 7:
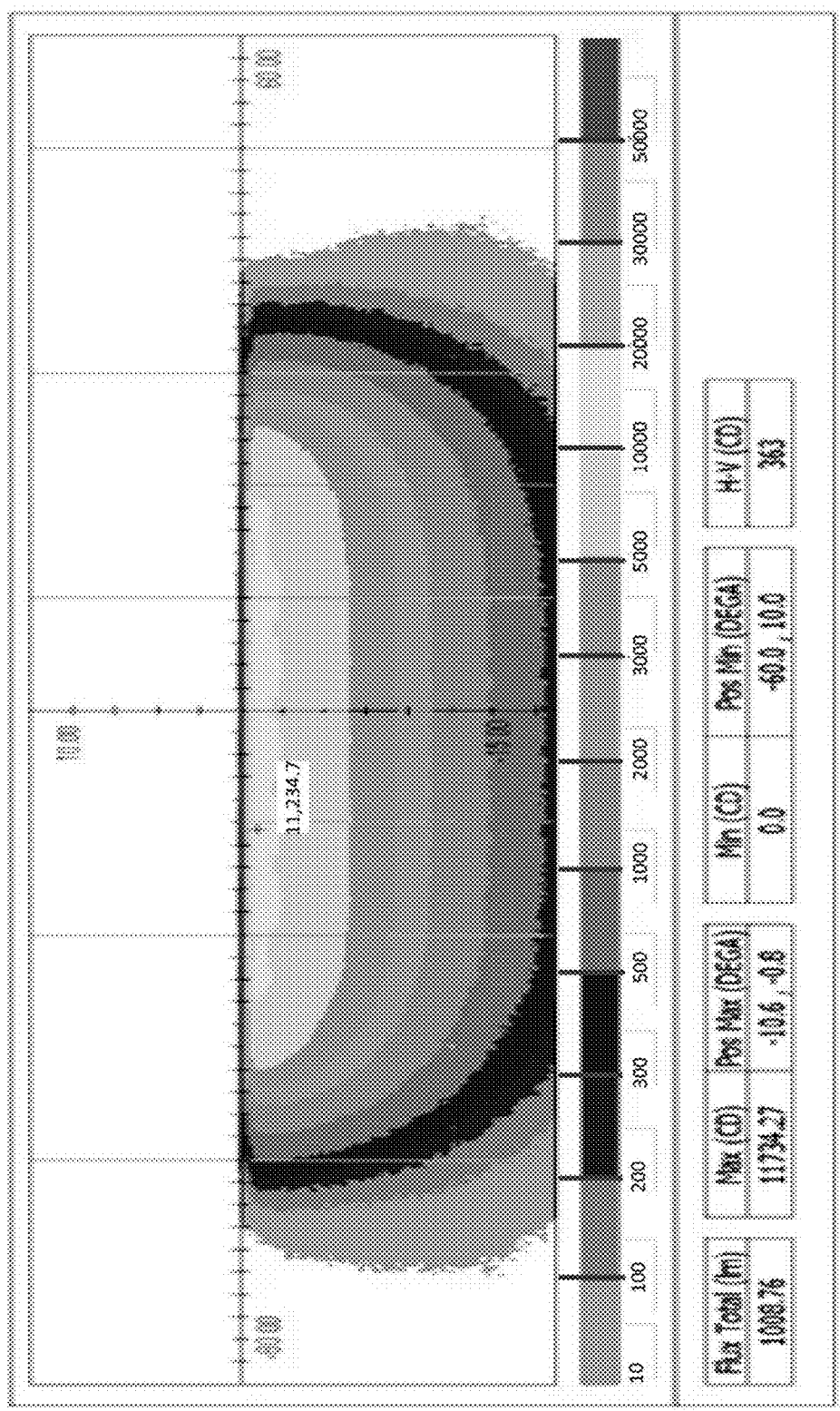
FIG. 7 illustrates an exemplary luminous intensity distribution for a flat beam pattern of a LED component according to one embodiment.

FIG. 7 illustrates an exemplary luminous intensity distribution of the combined composite flat beam pattern of flat reflectors 1-8. All of the flat reflectors 1-8 are activated in FIG. 7.

Figure 8:
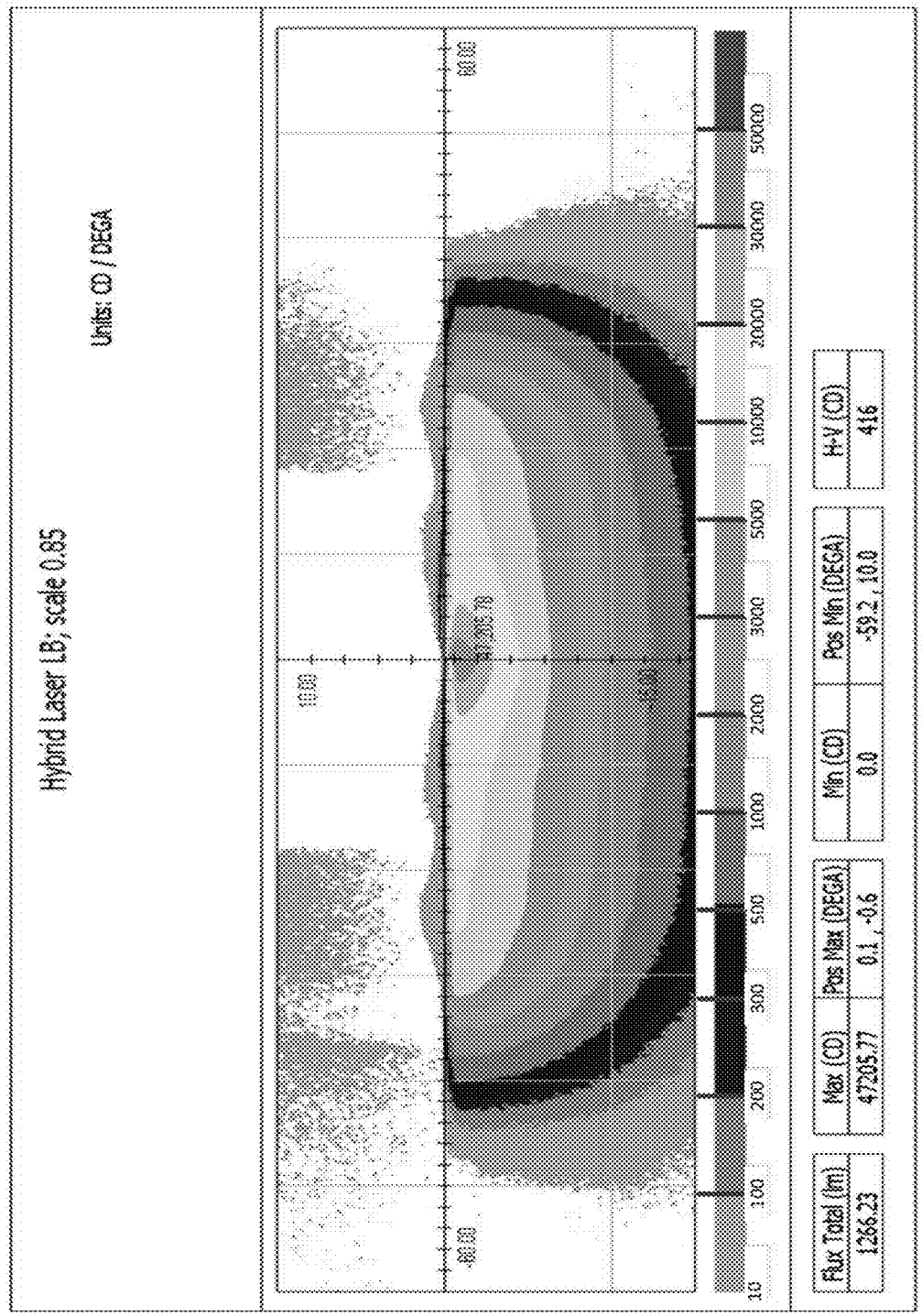
FIG. 8 illustrates an exemplary combined luminous intensity distribution for a hybrid LED module and laser diode module according to one embodiment.

FIG. 8 illustrates an exemplary combined luminous intensity distribution for a hybrid flat module and a kink module. In one embodiment, a laser diode module includes a first laser diode source $LD_1$ and/or a second laser diode source $LD_2$. The combination of a LED flat module with a laser diode module produces a high performance uniform light beam. The hybrid low beam headlamp provides a thin aspect headlamp assembly for optimal down-the-road lamp performance at a cost lower than an entire laser diode assembly.

Embodiments described herein include systems in which a hybrid module is modified to create a dark region for display of a road-writing image that meets vehicle headlamp standards. The hybrid module includes a flat module having a plurality of flat reflectors, such as the reflectors illustrated in FIG. 6. In addition, the hybrid module includes a near-field DMD segment and a far-field DMD segment.

Table 1 illustrates a system in which certain low beam segments are activated, either partially or completely, and other low beam segments are not activated for the left headlamp (LH) and the right headlamp (RH).

TABLE 1

Activation of Individual Segments for Road Writing Functions.

| Segment | LH | RH |
| --- | --- | --- |
| 1 (N + 3) inboard | 5% | 5% |
| 2 (N + 2) | 5% | 5% |
| 3 (N + 1) | OFF | OFF |
| 4 (N0) | OFF | OFF |
| 5 (N − 1) | OFF | OFF |
| 6 (N − 2) | ON (50%) | ON (50%) |
| 7 (N − 3) | ON (50%) | ON (50%) |
| 8 (N − 4) outboard | ON (50%) | ON (50%) |
| DMD NF (→ road-writing) | ON | ON |
| DMD FF (→kink) | ON | ON |

In Table 1, the first and second segments for the LH and the RH are operating at 5% power. The third, fourth, and fifth segments are inactivated for the LH and the RH. The sixth, seventh, and eighth segments are operating at 50% power for the LH and the RH. The near-field DMD segment and the far-field DMD segment are activated for the LH and the RH. $Kink_1$ of the kink module is inactivated in Table 1.

In Table 1, segments 1 and 2 are primarily for inboard lighting, and hence are at a low 5% maximum power. Segments 6-8 are primarily for outboard lighting, and hence are at 50% maximum power. The near-field DMD segment projects light downward towards the ground, while the far-field DMD segment projects light along the horizon.

The system described above with reference to Table 1 provides a mechanism of creating an opening in the luminous distribution pattern for projection of a road-writing image, via segments 3, 4, and 5 being deactivated, while leaving the remaining segments at least partially activated. In addition, a mechanism is provided in which to activate or deactivate the road-writing kink, i.e. the near-field DMD segment and the far-field DMD segment. Therefore, an opening in the luminous distribution pattern can be created for projection of a road-writing image without sacrificing or altering the remaining luminous distribution pattern. Other segment variations of activation are contemplated by embodiments described herein, which depend upon specific vehicle and optical systems.

Figure 9:
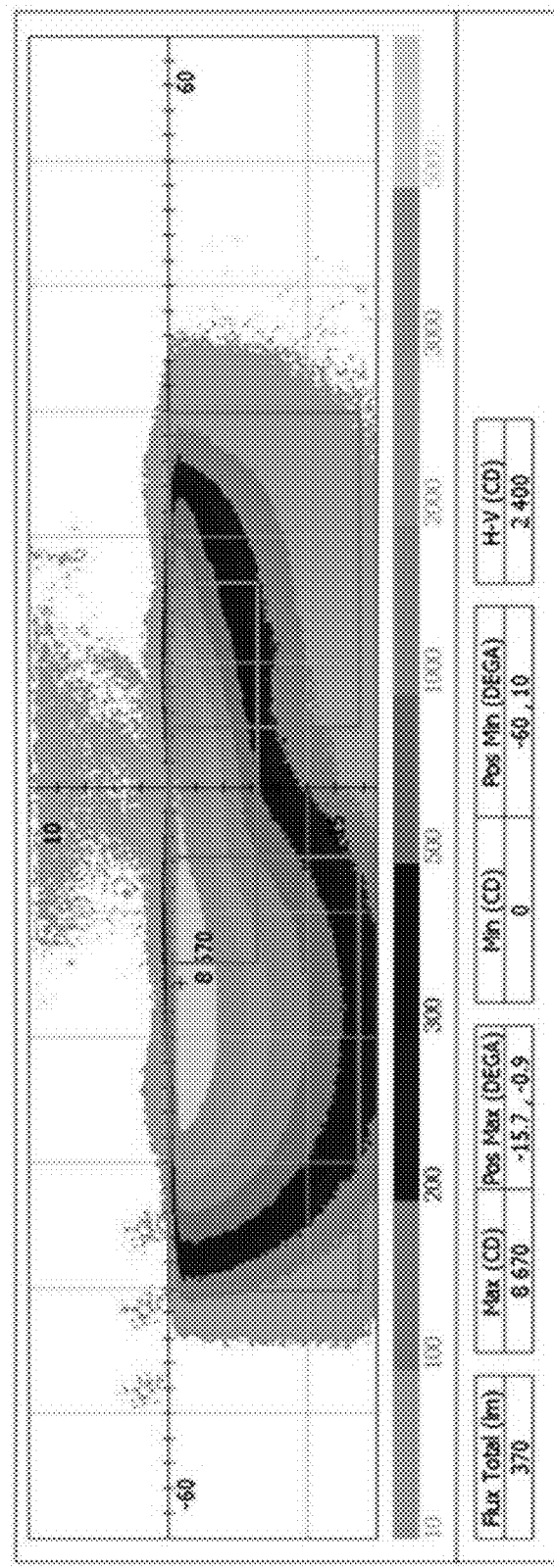
FIG. 9 illustrates a luminous intensity distribution pattern according to one embodiment.

FIG. 9 illustrates a luminous intensity distribution pattern according to the specifications of Table 1, except there is no DMD segment activation in FIG. 9. The hybrid module includes $kink_1$ and $kink_2$ and the LED flat module includes eight flat reflectors. In one embodiment, only $kink_2$ is activated at a blend of approximately 75% power.

FIG. 9 illustrates activation of the flat module and the kink modules only (with no DMD segments activated). There is an intense amount of light on the left region of the distribution pattern because the small flat segments (segments 6-8) are activated and the middle segments (segments 3-5) are not activated. At approximately 20° to the right, there is a small amount of light intensity illustrated from the 5% powered segments 1-2.

Figure 10:
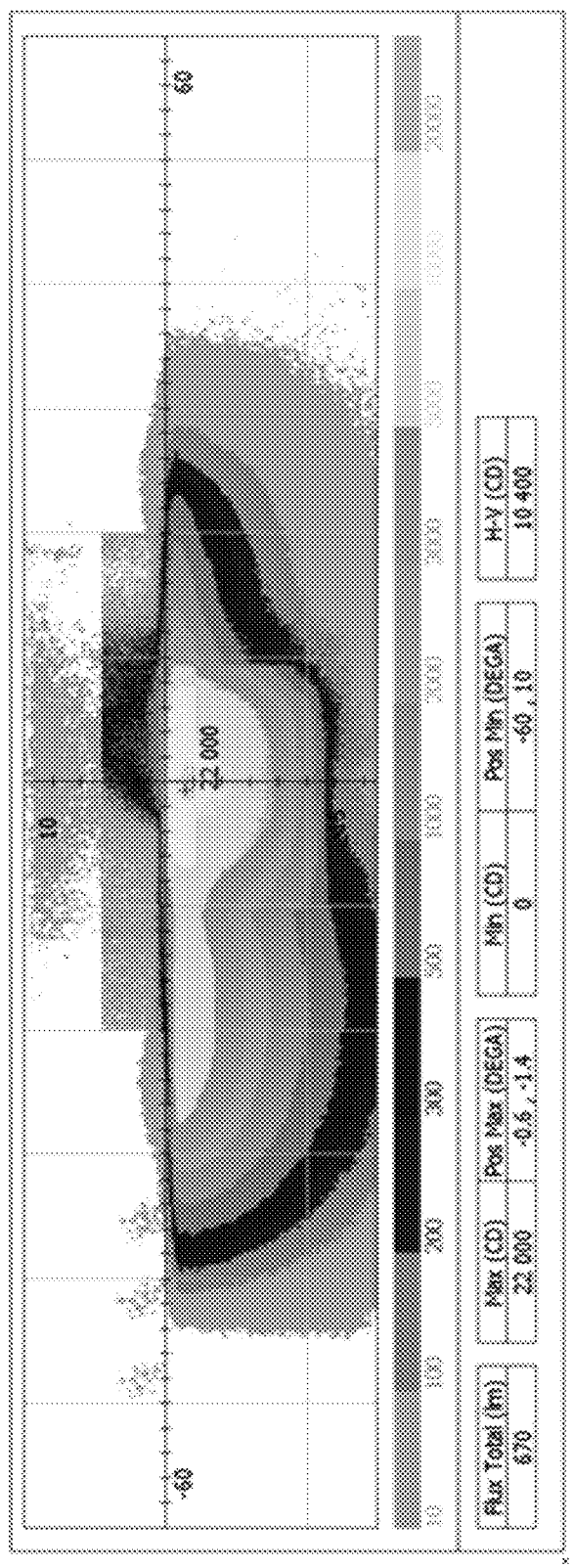
FIG. 10 illustrates a luminous intensity distribution pattern with the near-field DMD segment and the far-field DMD segment activated according to one embodiment.

FIG. 10 illustrates a luminous intensity distribution pattern according to the specifications of Table 1 with the near-field DMD segment and the far-field DMD segment activated. In one embodiment, only $kink_2$ is activated; the far-field DMD segment could be used to create a kink step, if necessary.

In FIG. 10, the two DMD segments provide a higher intensity luminous distribution about the center of the vertical axis. There is also more light intensity added near the hot spot, illustrated by the number 22,000. In one embodiment, the two segments are separate modules. However, the two segments could be combined into a single module.

The luminous intensity distribution pattern of FIG. 10 illustrates a central region about the vertical axis in which a road-writing image can be projected into the central region of the road surface in front of the vehicle. In addition, all low beam test points can achieve a pass rating for standard vehicle headlamp requirements using embodiments described herein.

Figure 11:
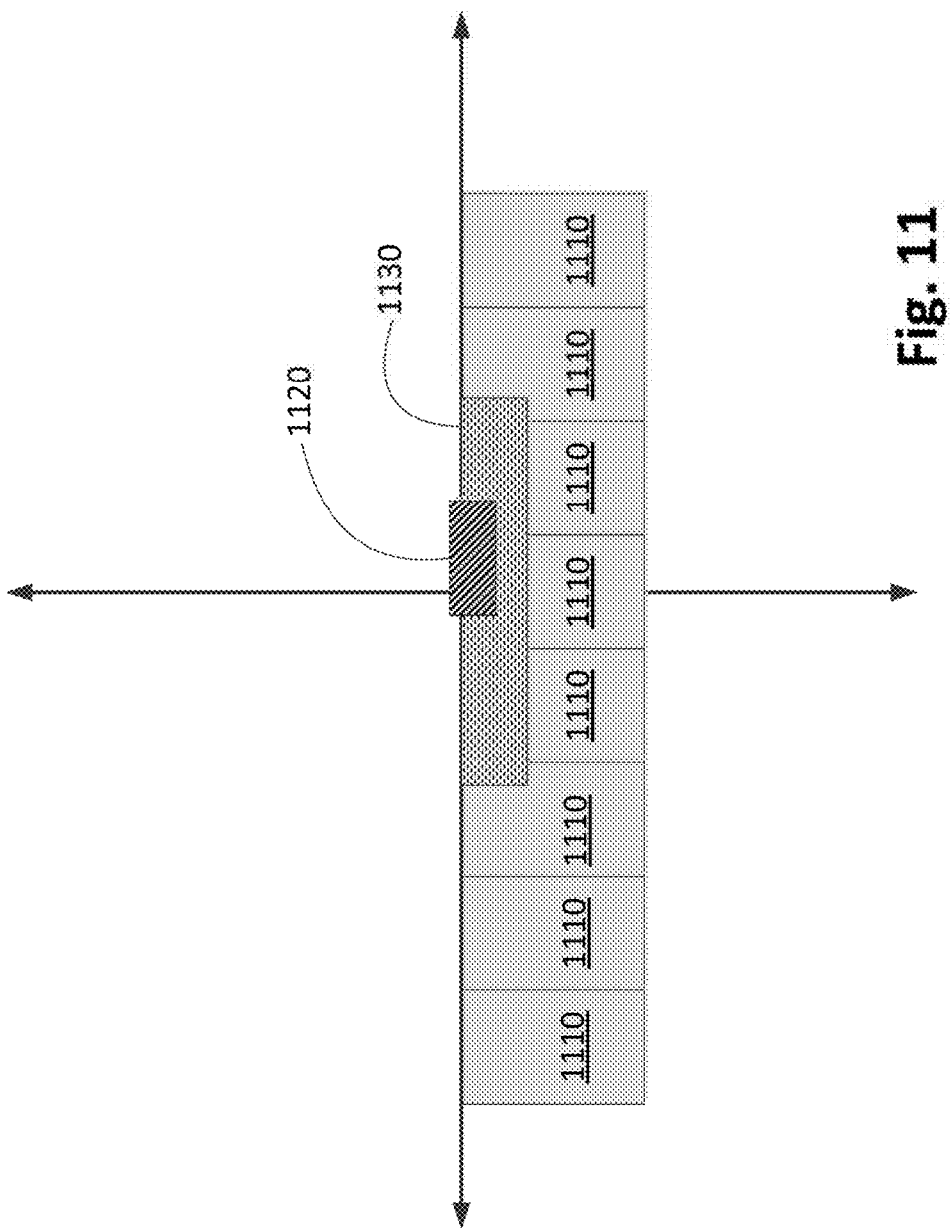
FIG. 11 is a block diagram illustrating activation of various segments of a headlamp low beam illumination according to one embodiment.

FIG. 11 is a block diagram illustrating activation of various segments of a headlamp low beam distribution. FIG. 11 illustrates a standard distribution with no DMD activation, i.e. no road-writing activation or capabilities. FIG. 11 illustrates eight flat segments 1110, and a first kink 1120 located primarily below the horizontal axis and primarily to the right of the vertical axis. A second kink 1130 is located just below the horizontal axis and equally about the vertical axis. The second kink 1130 is wider than the first kink 1120.

Figure 12:
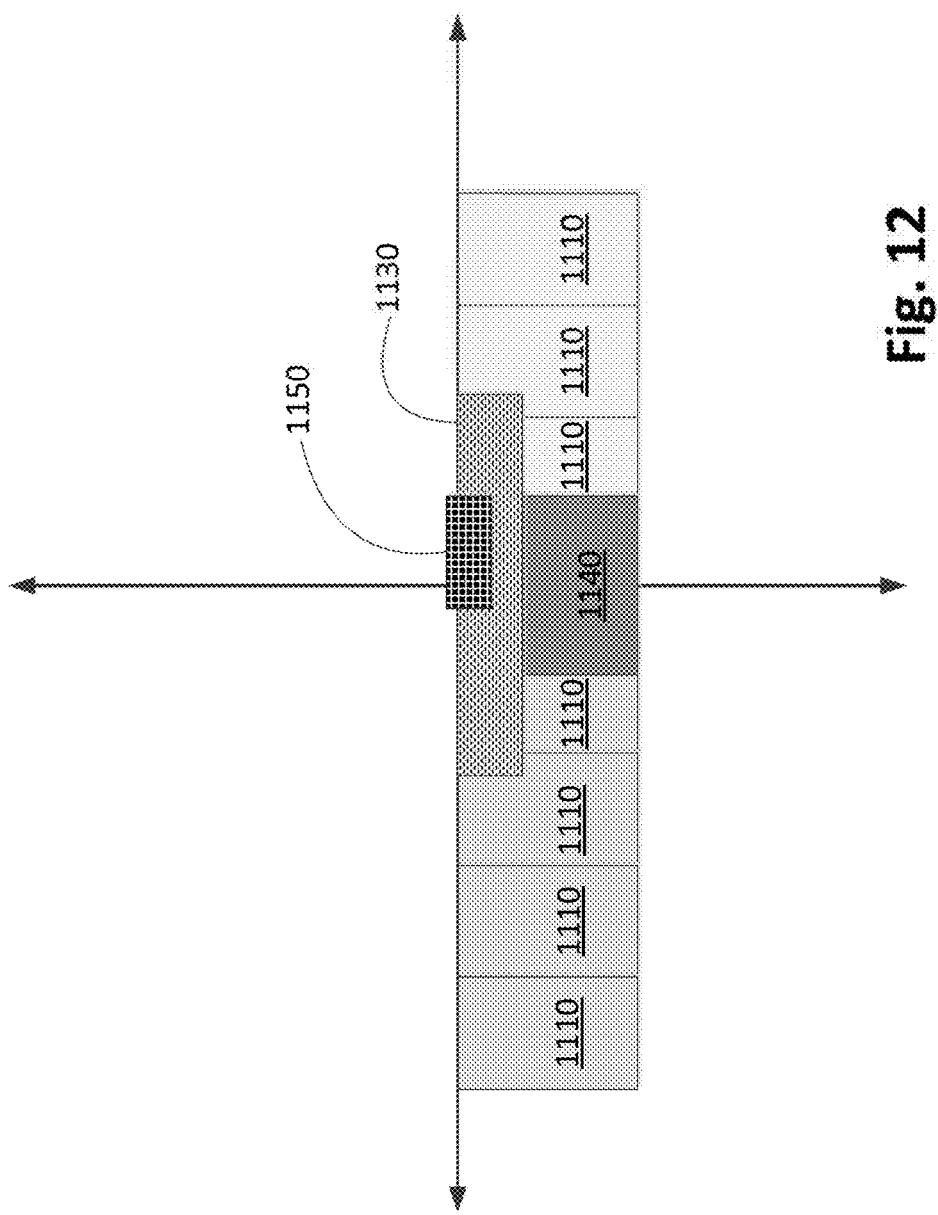
FIG. 12 is a block diagram illustrating four flat segments located to the left are activated, a middle flat segment is not activated, and three flat segments located to the right are activated at a reduced power level according to one embodiment.

FIG. 12 is a block diagram of the headlamp low beam distribution during activation of road-writing features. Four of the flat segments 1110 located to the left of the vertical axis are activated, one or more middle flat segments 1110 (out of view) are inactivated during activation of road-writing features, and three of the flat segments 1110 located to the right of the vertical axis are activated at a reduced power level. Other power level settings for the activated flat segments 1110 are contemplated by embodiments described herein and are dependent upon the final headlamp implementation.

A near-field DMD segment 1140 has road-writing features for image projection near the front of the vehicle. When the near-field DMD segment 1140 is activated, the one or more middle flat segments 1110 located in the vicinity of the near-field DMD segment 1140 are inactivated. In Table 1, three middle flat segments 1110 are inactivated during activation of the near-field DMD segment 1140. In addition, a far-field DMD segment 1150 has complementary road-writing features to provide contrast lighting for the projected image upon the horizon. When the far-field DMD segment 1150 is activated, the first kink 1120 is inactivated. If the first kink 1120 is still activated during image projection, it creates too much parasitic light and as a result, it reduces the contrast between the projected image from the near-field DMD segment 1140 and the background. In addition, a safety issue can be created if the first kink 1120 is a laser diode. Therefore, an improved result is obtained by inactivating the first kink 1120 when using the DMD segments. The second kink 1130 is still activated.

When the DMD segments are not activated to project an image, the headlamp low beam distribution resorts to the configuration of FIG. 11. When road-writing features are not activated, the one or more middle flat segments 1110 and the first kink 1120 are activated.

Figure 13:
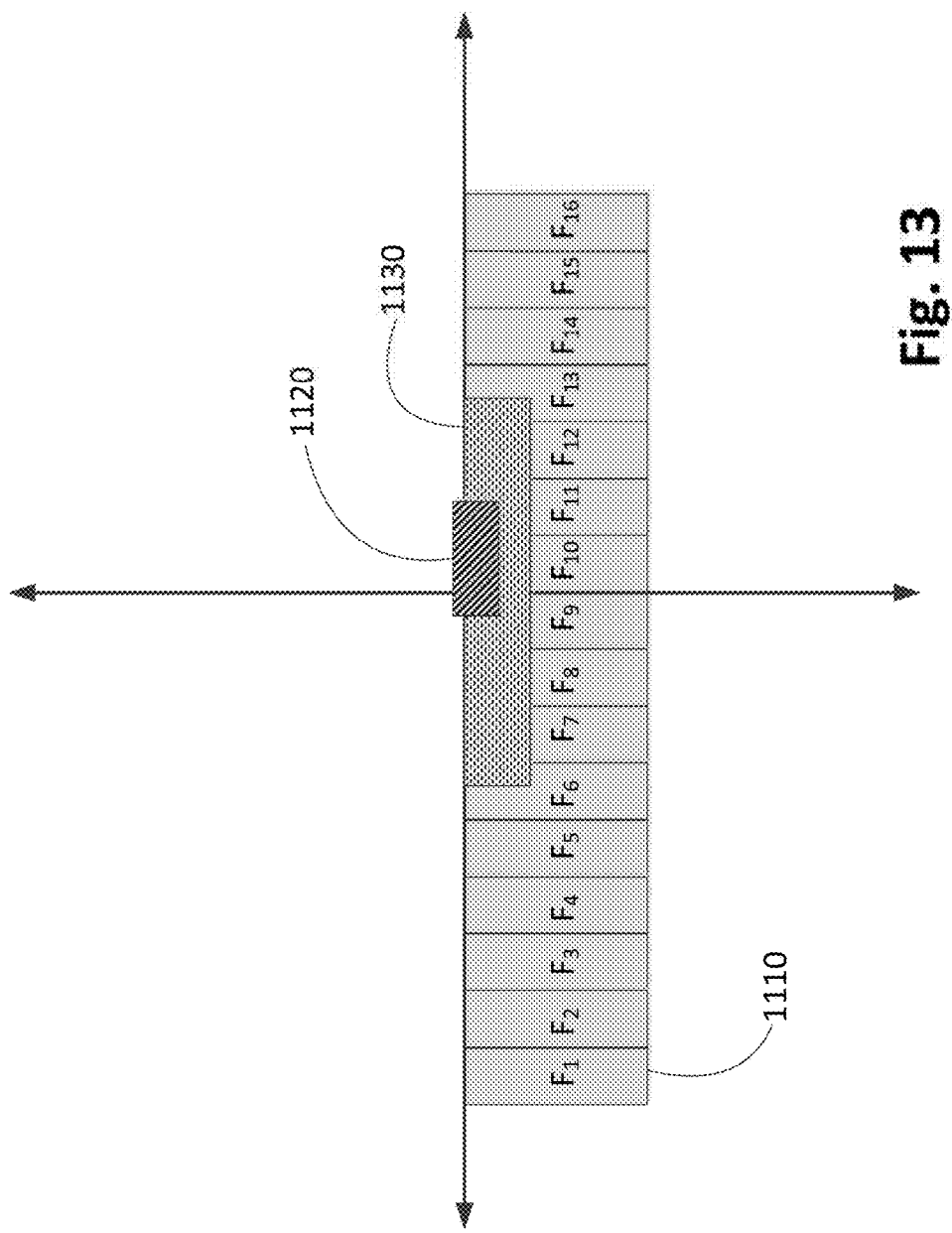
FIG. 13 is a block diagram illustrating a larger number of flat segments according to one embodiment.

FIG. 13 is a block diagram illustrating the headlamp low beam distribution of FIG. 11, except there are a larger number of flat segments 1110, labeled as $F_1$-$F_{16}$. Additional flat segments 1110 provide a mechanism for better control of the final headlamp. FIG. 13 illustrates sixteen flat segments 1110. However, more or less than sixteen flat segments 1110 are contemplated by embodiments described herein and depend upon the final desired headlamp implementation.

Figure 14:
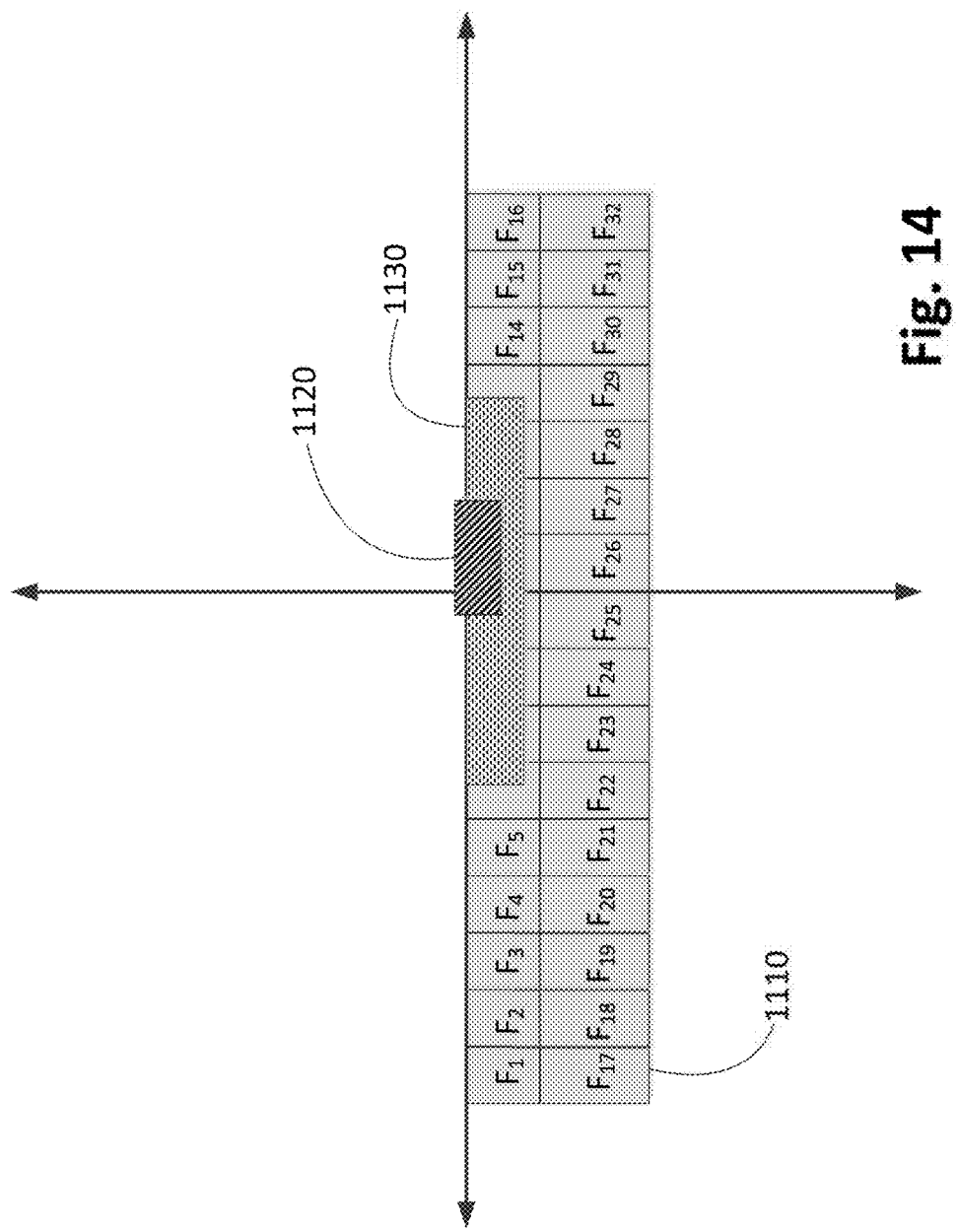
FIG. 14 is a block diagram illustrating two rows of flat segments according to one embodiment.

FIG. 14 is a block diagram illustrating the headlamp low beam distribution of FIG. 13 with two rows of flat segments 1110 for a total of thirty two flat segments 1110, labeled as F$_1$-F$_{32}$. In one embodiment, the smaller-sized upper row of flat segments 1110 has an increased power level. However, other variations can be implemented having two separate rows of flat segments 1110. In addition, the total number of flat segments 1110 can vary and depend upon a final desired headlamp implementation.

Figure 15:
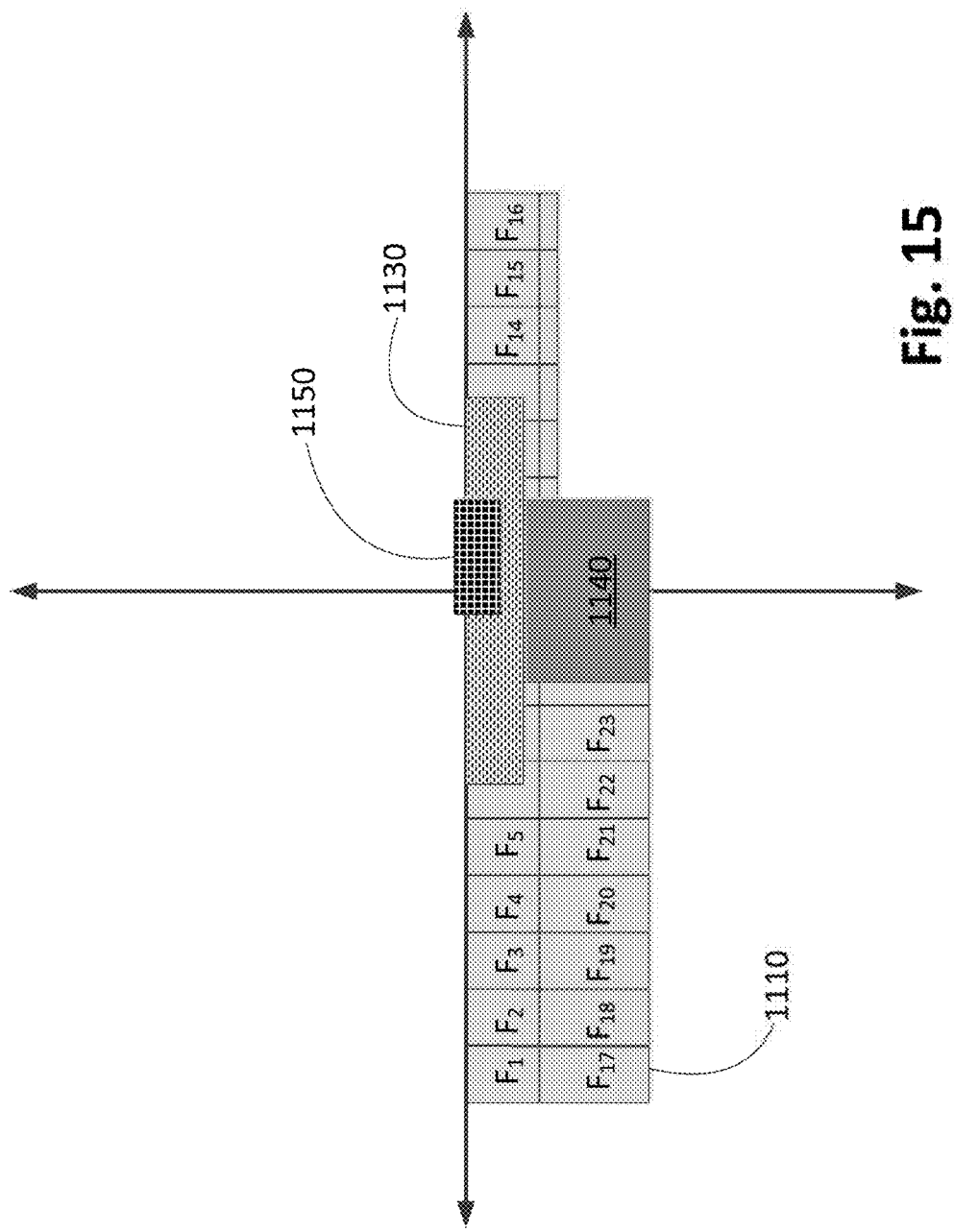
FIG. 15 is a block diagram illustrating a headlamp low beam illumination with road-writing features according to one embodiment.

FIG. 15 is a block diagram illustrating a headlamp low beam distribution with road-writing features, similar to FIG. 12. FIG. 15 also includes two rows of flat segments 1110 as illustrated in FIG. 14. In FIG. 15, the flat segments 1110 in the top row are activated at full power. The flat segments 1110 on the left side of the bottom row are activated at full power, while the flat segments 1110 in the middle and on the right side of the bottom row are not activated.

The smaller-sized flat segments 1110 in the upper row of FIG. 15 can provide a higher power level capability. In one embodiment, an optical system can be projected via the increased power level of the flat segments 1110 in the upper row. In a second embodiment, the flat segments 1110 on the right side of the bottom row can be activated at a lower power level.

FIG. 12 and FIG. 15 illustrate the advantages of embodiments described herein. The headlamp low beam distribution illustrates a configuration of flat segments 1110, a second kink 1130, a near-field DMD segment 1140, and a far-field DMD segment 1150 for road-writing capabilities. A clear image with a contrasting background is projected onto the road surface, which also maintains satisfactory vehicle headlamp standards.

Figure 16:
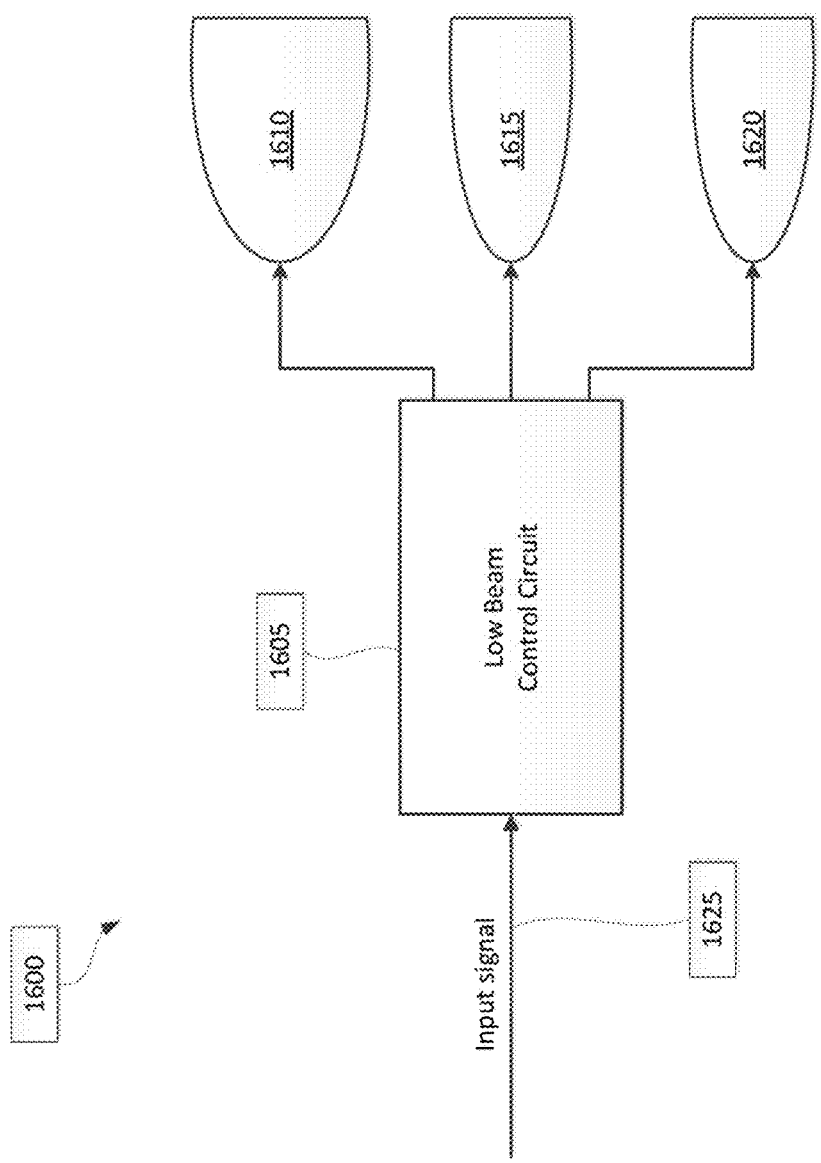
FIG. 16 illustrates a functional block diagram of an exemplary low beam headlamp assembly according to one embodiment.

FIG. 16 illustrates a functional block diagram of a low beam headlamp assembly 1600. Low beam headlamp assembly 1600 includes a low beam control circuit 1605, a laser diode module 1610, and an LED module 1615. One or more optional modules 1620 include additional LED modules, aside from LED module 1615. An input signal 1625 is connected to the low beam control circuit 1605. The input signal 1625 can be a switch to initiate or close power to one or more of the laser diode module 1610, the LED module 1615, and the optional LED module(s) 1620. Other types of input signals 1625 are contemplated by embodiments described herein, such as a light/dark input signal.

It should be noted that while FIG. 16 illustrates low beam control circuit 1605 is included within low beam headlamp assembly 1600, low beam control circuit 1605 could also be located apart from low beam headlamp assembly 1600. Moreover, a single low beam control circuit 1605 can be employed for both a right and left low beam headlamp assembly such that the laser diode module 1610, the LED module 1615, and the optional LED module(s) 1620 are driven in a synchronized manner.

The low beam control circuit 1605 includes circuitry configured to implement embodiments described herein for the low beam headlamp assembly 1600. The circuitry is configured at least in part, to inactivate one or more of the flat luminous segments 1110 located within the near-field road-writing segment 1140 of the low-beam distribution and inactivate the first light source, such as the first kink 1120 when the near-field road-writing segment 1140 and the far-field road-writing segment 1150 are activated.

Figure 17:
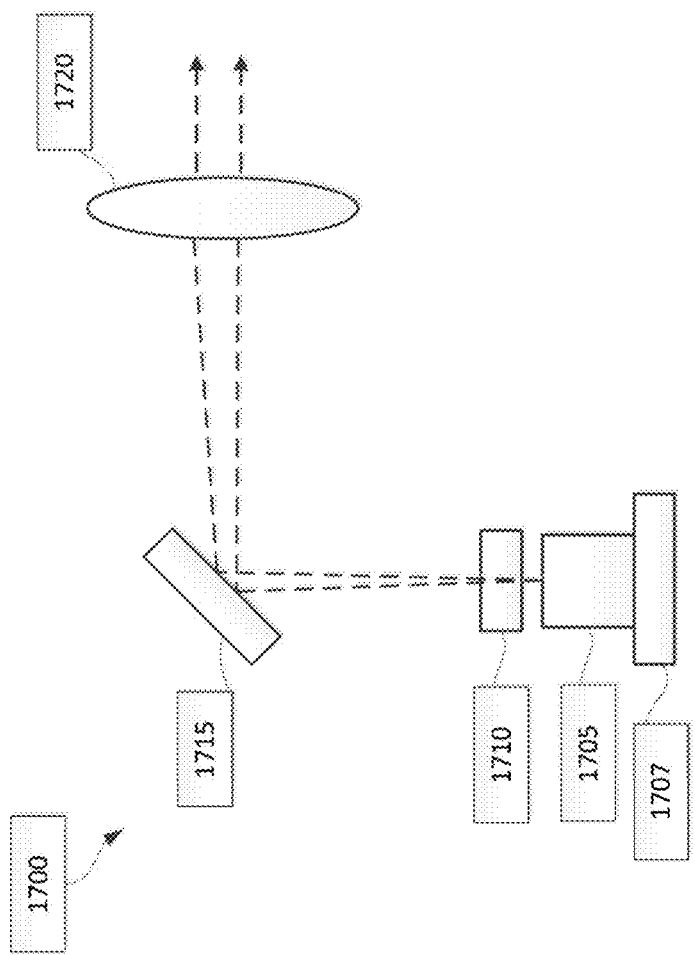
FIG. 17 illustrates a functional block diagram of an exemplary laser diode module according to one embodiment.

FIG. 17 illustrates a functional block diagram of an exemplary laser diode module 1700, which includes a laser emitter 1705, a phosphor plate 1710, a mirror 1715, and a lens 1720. Laser emitter 1705 may, in some implementations, include a laser diode with emission in the blue visible spectrum (for example, with a wavelength in the range of 360 and 480 nm). Laser emitter 1705 can, in some embodiments, be mounted on a heatsink 1707.

The light from laser emitter 1705 is directed through phosphor plate 1710. Phosphor plate 1710 can include phosphors such as, but not limited to, YAG, LuAG, nitride, oxy-nitride, and the like. Phosphor plate 1710 converts the light from laser emitter 1705 to a white light. In place of phosphor plate 1710, laser emitter 1705 can be coated with a phosphor layer of similar materials.

The light from laser emitter 1705 is reflected by mirror 1715. Mirror 1715 can, in some embodiments, include actuators and/or vibrators configured to broaden or tailor the shape of the light beam from laser emitter 1705. The light reflected from mirror 1715 passes through lens 1720. Other components can be employed in laser module 1700 to detect failure of phosphor plate 1710 or mirror 1715 to ensure the safety of laser module 1700.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A headlamp assembly, comprising:
a low beam assembly configured to generate a low-beam distribution including
a plurality of flat luminous segments configured to produce a composite flat beam pattern when activated;
a kink module having a first light source and a second light source;
a near-field road-writing segment located about a central vertical position of the low-beam distribution;
a far-field road-writing segment located above the near-field road-writing segment of the low-beam distribution; and
circuitry configured to inactivate one or more of the flat luminous segments located within the near-field road-writing segment of the low-beam distribution and inactivate the first light source when the near-field road-writing segment and the far-field road-writing segment are activated; and
a high beam assembly configured to generate a high-beam distribution.

2. The headlamp assembly of claim 1, wherein the near-field road-writing segment includes a digital micro-mirror device (DMD) near-field road-writing segment and the far-field road-writing segment includes a DMD far-field road-writing segment.

3. The headlamp assembly of claim 1, wherein the circuitry is further configured to keep the second light source activated when the near-field road-writing segment and the far-field road-writing segment are activated.

4. The headlamp assembly of claim 1, wherein a first power level of a first group of flat luminous segments differs from a second power level of a second group of flat luminous segments.

5. The headlamp assembly of claim 1, wherein the plurality of flat luminous segments includes a range of seven to thirty two individual flat luminous segments.

6. The headlamp assembly of claim 1, wherein the plurality of flat luminous segments includes a first row and a second row of individual flat luminous segments.

7. The headlamp assembly of claim 6, wherein a first power level of the first row of individual flat luminous segments differs from a second power level of the second row of individual flat luminous segments.

8. The headlamp assembly of claim 1, wherein the first light source includes a laser diode light source.

9. A low beam headlamp assembly, comprising:
a plurality of flat luminous segments configured to produce a composite flat beam pattern of a low-beam distribution when activated;
a kink module having a first light source and a second light source;
a near-field road-writing segment located about a central vertical position of the low-beam distribution;
a far-field road-writing segment located above the near-field road-writing segment of the low-beam distribution; and
circuitry configured to inactivate one or more of the flat luminous segments located within the near-field road-writing segment of the low-beam distribution and inactivate the first light source when the near-field road-writing segment and the far-field road-writing segment are activated.

10. The low beam headlamp assembly of claim 9, wherein the near-field road-writing segment includes a digital micromirror device (DMD) near-field road-writing segment and the far-field road-writing segment includes a DMD far-field road-writing segment.

11. The low beam headlamp assembly of claim 9, wherein the circuitry is further configured to keep the second light source activated when the near-field road-writing segment and the far-field road-writing segment are activated.

12. The low beam headlamp assembly of claim 9, wherein a first power level of a first group of flat luminous segments differs from a second power level of a second group of flat luminous segments.

13. The low beam headlamp assembly of claim 9, wherein the plurality of flat luminous segments includes a range of seven to thirty two individual flat luminous segments.

14. The low beam headlamp assembly of claim 9, wherein the plurality of flat luminous segments includes a first row and a second row of individual flat luminous segments.

15. The low beam headlamp assembly of claim 14, wherein a first power level of the first row of individual flat luminous segments differs from a second power level of the second row of individual flat luminous segments.

16. The low beam headlamp assembly of claim 9, wherein the first light source includes a laser diode light source.

* * * * *